Sept. 5, 1933.  W. L. KEEFER  1,925,447
VIBRATORY SCREEN
Filed Aug. 25, 1931
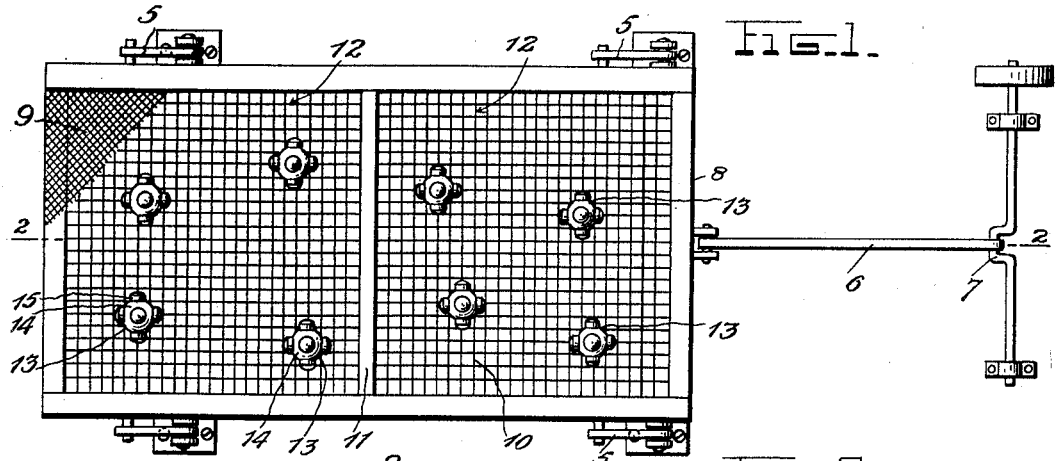
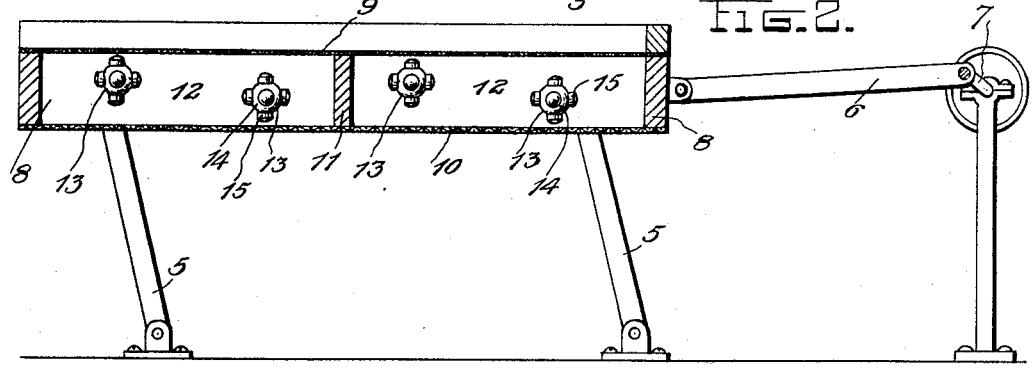
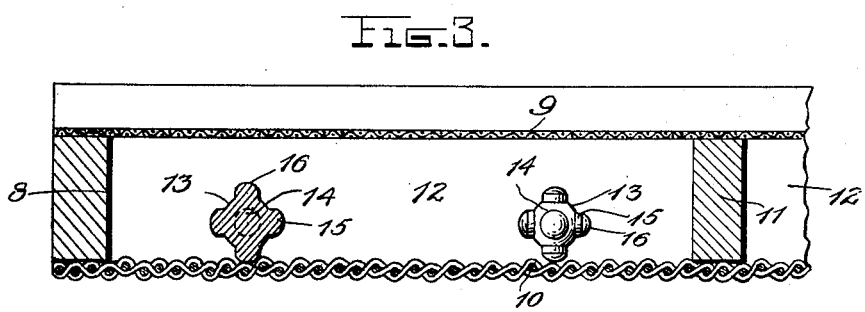
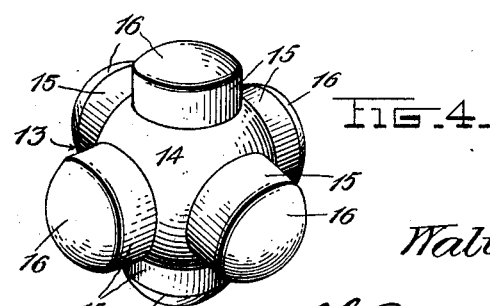
Witness
C. E. Hunt.
Inventor
Walter L. Keefer
By H. B. Willson &Co.
Attorneys.

UNITED STATES PATENT OFFICE 1,925,447

VIBRATORY SCREEN

Walter L. Keefer, Chambersburg, Pa., assignor to Harry G. Wolf, Chambersburg, Pa.

Application August 25, 1931. Serial No. 559,296

1 Claim. (Cl. 209—323)

The invention relates to improvements in bolting and other vibratory or gyratory screens of the type embodying upper and lower screens and a plurality of knockers loosely confined between said screens and adapted to repeatedly strike the upper screen during vibration of the structure, to thereby insure feeding of the material through said upper screen. I am aware of the fact that screens of this general nature have heretofore been provided embodying resilient balls confined between the upper and lower screens and rods over the lower screen to strike said balls and cause vertical jumping thereof; embodying floating brushes confined between the upper and lower screens and engaging the upper screen and of a horizontal dimension greater than the vertical distance between the screens; and embodying pads having hemispherical central supports, said pads and supports being disposed between the upper and lower screens and the former being of horizontal dimensions greater than the distance between the screens. It is the aim of my invention however to provide an improved structure in which a knocker of improved construction is confined between the two screens and is itself provided with differently directed projections which cause it to jump and strike the upper screen as the screen as a whole is vibrated, said knocker having its greatest straight dimension considerably less than the distance between the screens, allowing it to jump freely in all directions.

With the foregoing in view, the invention resides in the novel subject matter hereinafter described and claimed, description being accomplished by reference to the accompanying drawing.

Fig. 1 is a top plan view partly broken away showing one conventional form of screen improved in accordance with the invention.

Fig. 2 is a sectional view on line 2—2 of Fig. 1.

Fig. 3 is an enlarged detail sectional view.

Fig. 4 is a perspective view of one of the knockers.

For illustrative purposes, the invention is shown in connection with a screen which is supported by links 5 for horizontal reciprocation, a pitman 6 and driven crank 7 being shown for reciprocating said screen. It is to be understood however that this illustration is only for illustrative purposes and that the improvement herein described may be used in connection with a screen of any desired vibratory or gyratory type, whether the vibration or gyration, etc. be imparted by one means or another and regardless of the manner in which the screen is supported.

The screen shown embodies a frame 8, an upper relatively fine screen or bolting cloth 9, and a lower comparatively coarse screen 10, the frame-contained space between the two screens 9 and 10 being divided by a partition 11 into two pockets 12, in which the improved vibrators or knockers 13 are loosely confined, said parts 13 being hereinafter referred to as knockers, in the descriptive matter. It is to be understood however, that the invention is not restricted to any particular way of confining the knockers between the upper and lower screens and that any desired number of these knockers may be employed.

Each knocker 13 consists of a body 14 and a plurality of differently directed projections 15 unitarily connected with said body, the greatest straight dimension of said knocker being considerably less than the space between the screens 9 and 10, allowing said knocker to jump freely in all directions.

The body 14 and its projections 15 may all be rigid or substantially rigid, or may all be elastic; body 14 may be elastic and projections 15 rigid or substantially rigid; or body 14 may be rigid or substantially rigid and projections 15 elastic. Live rubber is illustrative of a preferred material for obtaining the desired elastic qualities, whether for body 14 alone, for projections 15 alone, or for both said body and said projections. In most instances, the body 14 and its projections 15 will be integrally joined to each other, allowing the entire knocker 13 to be formed by a single molding operation.

In the construction herein disclosed, the body 14 is substantially spherical and the projections 15 are substantially cylindrical, said projections however being provided with convex outer ends 16. Six of these projections are shown of equal length and diameter and spaced apart equally upon the periphery of the body 14, and while this construction is preferred, it is to be understood that the invention is not restricted to the specific details disclosed, for probably the same results could be obtained with the various projections of different sizes or with said projections of different lengths, or both, regardless of the shaping of the outer ends of said projections and their transverse formations. Similarly, while the size of the body 14 compared to the projections 15, is preferably about as shown and while said body may be advantageously constructed in the form of a sphere, the invention is not restricted to the relative sizes shown nor to the exact shape of the body.

The invention has proven to be of great efficiency for vertically vibrating the upper screen or bolting cloth 9 and insuring proper sifting of material therethrough. As the screen is reciprocated or otherwise vibrated, the projections 15 cause the knockers 13 to jump in various directions and each time they jump upwardly, they strike and effectively vibrate the upper screen or bolting cloth. Hence, by the extremely simple construction herein disclosed, excellent results are obtainable.

I claim:—

In a vibratory or gyratory screen having an upper screen and a lower screen, the latter being in a single plane throughout its area; a knocker or vibrator confined loosely between said screens and comprising an elastic substantially spherical rubber body having a plurality of differently directed elastic projections unitarily connected therewith, the greatest straight dimension of said knocker or vibrator being less than the distance between said screens, allowing said knocker or vibrator to jump freely in all directions.

WALTER L. KEEFER.